(12) United States Patent
Rapaport et al.

(10) Patent No.: US 9,300,683 B2
(45) Date of Patent: Mar. 29, 2016

(54) IDENTIFYING BOTS

(75) Inventors: Shay Rapaport, Kfar Saba (IL); Erez Azaria, Gedera (IL)

(73) Assignee: FIREBLADE LTD., Tel Aviv (IL)

( * ) Notice: Subject to any disclaimer, the term of this patent is extended or adjusted under 35 U.S.C. 154(b) by 0 days.

(21) Appl. No.: 13/376,413

(22) PCT Filed: Jun. 10, 2010

(86) PCT No.: PCT/IB2010/052588
§ 371 (c)(1),
(2), (4) Date: Dec. 6, 2011

(87) PCT Pub. No.: WO2010/143152
PCT Pub. Date: Dec. 16, 2010

(65) Prior Publication Data
US 2012/0090030 A1    Apr. 12, 2012

Related U.S. Application Data

(60) Provisional application No. 61/185,938, filed on Jun. 10, 2009.

(51) Int. Cl.
*H04L 29/06*    (2006.01)
(52) U.S. Cl.
CPC .......... *H04L 63/1441* (2013.01); *H04L 63/168* (2013.01); *H04L 2463/144* (2013.01)
(58) Field of Classification Search
CPC ..................... H04L 63/1441; H04L 2463/144; H04L 29/14; H04L 9/002
USPC ........................................................... 726/23
See application file for complete search history.

(56) References Cited

U.S. PATENT DOCUMENTS

| | | | |
|---|---|---|---|
| 8,316,310 B2* | 11/2012 | Champion et al. | 715/757 |
| 2006/0136249 A1* | 6/2006 | Kagan et al. | 705/1 |
| 2006/0190561 A1* | 8/2006 | Conboy et al. | 709/217 |
| 2007/0255821 A1* | 11/2007 | Ge et al. | 709/224 |
| 2007/0260520 A1* | 11/2007 | Jha et al. | 705/14 |
| 2008/0147673 A1* | 6/2008 | Candea et al. | 707/10 |
| 2008/0301808 A1* | 12/2008 | Calo et al. | 726/23 |
| 2009/0241174 A1* | 9/2009 | Rajan et al. | 726/5 |
| 2010/0031315 A1* | 2/2010 | Feng et al. | 726/3 |
| 2010/0250397 A1* | 9/2010 | Ippolito | 705/27 |
| 2011/0173178 A1* | 7/2011 | Conboy et al. | 707/709 |

* cited by examiner

*Primary Examiner* — Harunur Rashid
(74) *Attorney, Agent, or Firm* — Browdy and Neimark, PLLC

(57) ABSTRACT

A method of identifying if a web client has browser capabilities. An originating machine receives a web page request from the web client. The originating machine generates a page request id (PRID) and a script which, when executed by a web client with a browser, regenerates a PRID, and embeds the script in a response. The originating machine sends the response to the web client for the web client to process and, if the web client is capable, to execute the embedded script, thereby to regenerate a PRID, and to return the regenerated PRID to the originating machine. The originating machine compares the returned regenerated PRID with the generated PRID, a match indicating that the web client has browser capabilities.

43 Claims, 8 Drawing Sheets

```
<P style="display:none" id="item1">NzVXe qIDNXIs xWXIbfj XaoPDdN FXW ukX XvLCbjUh</P>
<A style="display:none" href="http://some site ref> id="item2">dVdzUJaN xPayX FaKsvyad otlaoJ
Aulbsfa QSMa</A>
<script type="text/javascript">

FUNCTION a() {enyaNx=22+53;return string.fromCharCode(enyaNx);}

FUNCTION b() {MyObj = DOCUMENT.getElementById("item1");return myObj.innerHTML.substr(3,1);}

FUNCTION c() {MyObj = DOCUMENT.getElementById("item1");return myObj.innerHTML.substr(6,1);}

FUNCTION c() {MyObj = DOCUMENT.getElementById("item2");return myObj.getAttribute('href').substr(11,1);}

FUNCTION genPid() {return a()=b()=c()=d() }

ALERT (genPid)

</script>
```

Figure 4

IDENTIFYING BOTS

TECHNICAL FIELD

The present invention relates to robotic internet surfing done by so-called bots and, in particular, to detecting suspicious behavior of bots and barring or restricting such behavior.

BACKGROUND ART

Bots, also known as web robots, spiders or web crawlers, are software applications that run automated tasks over the Internet. Typically, bots perform tasks that are both simple and structurally repetitive, at a much higher rate than would be possible for a human being. The largest usage of bots is web crawling, in which an automated script fetches, analyses and files information from web servers. Bots are used for many purposes; mainly for browsing, mapping and indexing data; monitoring the behavior of sites; advertising purposes; and, for commercial or academic research. In addition to their uses outlined above, bots may also be implemented where a response speed faster than that of human's is required (for example, gaming bots and auction-site robots) or, less commonly, in situations where the emulation of human activity is required (for example, chat bots). Unfortunately, there are also malicious bots, such as spam bots, that harvest email addresses from contact forms or guestbook pages; downloader programs that suck bandwidth by downloading entire web sites; web site scrapers that grab the content of web sites and re-use it without permission on automatically generated doorway pages; and custom crawlers, tailored for specific websites to steal information (typically regarding index sites, classifieds and large database sites) or spam (typically regarding forums, web mail and social networks) and the like.

From a technical aspect, bots can be divided into three main types: The first type is protocol based bots. These bots continuously generate a request using a certain protocol (such as, for example, HTTP or FTP) and receive a response, which is typically sent to a parser for analysis. These bots are simple and usually operate fast. They do not render the content they receive and hence have no browser capabilities. The second type is application bots which are based on protocol based bots but have more sophisticated parsing tools that render and interpret portions of the response (typically by having JavaScript capabilities). The third type is browser bots which are browsers (such as, for example, Internet Explorer, Firefox etc.) or browser platforms (such as, for example, Webkit) being controlled by an automation script. Browser bots are mechanically operated rather than being controlled by a human user.

There have been many attempts to identify and filter out malicious bots, such as, for example, by analyzing log files and/or by analyzing the frequency of HTTP requests per IP or by using a CAPTCHA. A CAPTCHA ("Completely Automated Public Turing test to tell Computers and Humans Apart") is a type of challenge-response test used in computing to ensure that the response is not generated by a computer. The process usually involves one computer (a server) asking a user to complete a simple test which the computer is able to generate and grade. Because other computers are unable to solve the CAPTCHA, any user entering a correct solution is presumed to be human. Thus, it is sometimes described as a reverse Turing test because it is administered by a machine and targeted to a human, in contrast to the standard Turing test that is typically administered by a human and targeted to a machine. A common type of CAPTCHA requires that the user types letters or digits from a distorted image that appears on the screen.

CAPTCHAs are vulnerable to hackers, both by sophisticated custom made OCR systems which recognize the distorted text, or by simple relay hack (A bot displays the CAPTCHA to a human user who fills it in, in order to let the bot carry on its crawling activity). CAPTCHAs are typically presented to users only in the event of form filling, in order to avoid interruption to web application flow; thus, any activity done before or after filling the form can be easily driven by a bot. Another attempt to identify bots is honey pots or spider traps, which are normally web pages accessible only from transparent links (e.g. white text on white background). Such honey pots assume those who browse these hidden pages are bots. Honey pots are only useful for identifying generic bots such as email harvesters.

Unfortunately, known bot identification methods can identify a suspicious activity by the user IP level or by the Session ID level. If a session is blocked, the bot can easily restart another session (typically by deleting a cookie file), while if an IP is blocked, legitimate users who may try to access the site from the same IP are blocked as well. Further more, these methods tend to yield too many false-positives (false identification of bots), or, if applied too carefully, too many false-negatives.

There is thus a need in the art for more efficient and reliable method for identifying bots and blocking them with less interruption to genuine human users.

SUMMARY OF THE INVENTION

This need is met by the method according to claim 1. Other features of the invention are set out in the subsequent claims.

According to one embodiment of the present invention, there is provided a method which differentiates an HTTP request from a client having browser capabilities from any other machine's request or software driven HTTP requests. "A client having browser capabilities" means any client having script interpreter or runtime environment and also having capabilities of accessing page and browser objects and rendering them into a document and a document object model (DOM).

According to another embodiment of the present invention, there is provided a mode for monitoring requests while continuing to serve the requested content by the web server. This mode is termed hereinafter the "passive mode". According to this embodiment, the requests are monitored for distinguishing between requests generated by clients having browser capabilities and any other client requests. "Monitoring" means capturing and analyzing traffic in a non-intrusive manner, as opposed to blocking which takes place on the "active mode". The "passive mode" optionally enables decision making rules before taking any active step. Such decision making rules can be, for example and without wishing to be limited, allowing the handling of specific requests from a client not having browser capabilities which are classified as being legitimate clients. Such legitimate users can be, for example and without wishing to be limited, a search engine indexing spider. Such decision making rules can, optionally and without wishing to be limited, classify the user according to level of suspiciousness for assigning one or more restrictions according to the level of suspiciousness and by the identity of the originator of the requests.

According to another embodiment of the present invention, there is provided a mode restricting requests that are detected as non-browser requests from receiving any web site page contents. This mode is termed hereinafter the "active mode". The active mode filters out any HTTP page request not generated by a browser, by not serving the desired contents to that request.

According to some embodiments of the invention, non-browser clients, which are considered as protocol bots or application bots, are detected by generating a unique page request id (hereinafter "PRID") per each client HTTP page request, embedding a client-side script within the response that is capable of regenerating and returning the same PRID only on a client having browser capabilities. "Page request id" means a unique identification of the page request, which is optionally composed of a random and/or unique combination of numbers and/or characters/letters, and is dynamically generated per each page request received from a client. PRID generation is optionally performed by the web server to which the request was sent, via, for example and without wishing to be limited, a server-side code (such as PHP, .Net framework languages, Python, and the like) or a server filter (such as ISAPI). Alternatively, a PRID can also be generated, by a logical or physical third party server or by any logical or physical network machine positioned in the network of the web server to monitor incoming traffic, such as a firewall, a web application firewall and the like. The machine in which PRID is generated is termed hereinafter "the originating machine". The generated PRID string is optionally stored on the originating machine, optionally in a session scope variable. The originating machine either generates or outputs a pre-generated client-side script (optionally, but not limited to JavaScript) which is embedded into the page returned to the client. The client-side script is intended, when interpreted and ran by a client having browser capabilities, to regenerate and return, on a separate request (optionally HTTP get/post, Ajax or on a cookie sent with the next request), the same PRID to the originating machine. The script sent to the client optionally comprises a sequence of functions or small "sub-scripts" which will generate the sequence of characters that comprise, altogether, the PRID. The client-side code which regenerates the PRID on a client that has browser capabilities is termed herein after "regeneration challenge". The set of client-side functions or "sub scripts" that are used to compose PRIDs for the regeneration challenge can optionally be changed from time to time, either generated by dedicated software which resides on the originating machine or by a third party machine (also referred to hereinafter as "controller machine") serving client-side code templates to the originating machine. When the client that receives the embedded regeneration challenge returns the PRID to the originating machine, the machine compares between the PRID it generated for the same page request and the PRID returned by the client. In case a match is found, it is determined that the original request was made by a client having browser capabilities, since only such a client would have run the embedded code, regenerated the PRID correctly and returned it on a separate request. The generated PRIDs and the returned regenerated PRIDs can be sent to the controller machine which inspects them and constantly checks match ratios and decides if a certain client is a bot, based on configurable match ratio rules. Match ratios may need to be set and calculated, since it is possible that even on browser clients, certain requests will not return a regenerated PRID if, for example, the request was quickly followed by another request, before the client-side regeneration challenge was run.

According to some embodiments, a controller machine produces banks of functions or "sub-scripts", each capable, when run on a browser, of generating a unique character or a certain string which can serve as a part of a PRID. The controller machine, once in a while, updates the functions or "sub-scripts" bank that it generates on the originating machine. For example only, a service machine may produce a bank of ten different client-side functions (or "sub-scripts") that yield, when run on a browser, the ten digits 0-9. This bank of functions will be copied to the originating machine (typically, a web server, though a network appliance may serve as both the originating machine and controller machine), which may, for a certain page request, generate a random PRID such as "194726". For this specific PRID, the originating machine will collect, from its functions bank, the six functions that generate the six digits 1, 9, 4, 7, 2, 6, and create a single script which comprises all of them in a sequence. This script generates the string "194726" when ran on a browser. This script is the regeneration challenge. The originating machine will embed the regeneration challenge into the response sent to the client. The originating machine stores the string "194726" locally and expects to get it on a separate request during the same user session. The PRIDs received during a session may be sent back to the controller machine, where match ratios can be calculated and sophisticated rules can be applied to decide if a certain session is generated by a bot, or if a certain IP contains sessions generated by a bot, and whether to take action against this bot.

According to another embodiment of the present invention, the regeneration challenge script is comprised both of small document portions (typically, and without wishing to be limited, HTML or XML) and a script, which runs certain queries on the document object model (DOM), which is supposed to be generated on a browser which renders the document. The query can inspect certain objects, attributes and values in the DOM, and return characters or strings, which will, altogether, serve to regenerate the PRID. In this manner, clients having a script runtime environment, but not having document rendering capabilities, will not be able to create the DOM and return the strings that will comprise the PRID. Typically, a set of small documents will be generated on the controller machine, each having document objects (such as, but without wishing to be limited, layers, tables, style sheets—each having IDs, attributes and values generated by the controller machine) with script functions that each yield a known character or string when run on a browser which rendered the document. For example only, a document portion can be a DIV tag, containing text, styles, tables and other HTML elements with attributes and values, which can be read through the document or the DOM by a script. Furthermore, since different web browser versions may generate slightly different DOMs from the same document (for example, certain object attributes may have capital letters on one browser and non-capital on another browser), this approach can serve to identify and verify the web browser type and version according to minor differences in the regenerated and returned PRID.

According to another embodiment of the present invention, originating machine, or controller machine, receives and stores, on a database, a memory collection or array or any other means of storage, a list of the generated PRIDs. Per each PRID originating machine or controller machine also stores an indication whether a regenerated PRID was returned on a separate request to the originating machine. If a certain user session or a certain IP address has more than a predetermined number and/or ratio of PRIDs not followed by client-side PRID submissions, this session or IP is optionally suspected one in which a client not having browser capabilities is engaged, and therefore optionally as having protocol or application bot. Human decision or state machine rules can optionally be further applied to decide what measures, if at all, should be taken against this session or IP.

According to some embodiments, the "active mode" can optionally restrict a client not having browser capabilities from receiving contents from web application by presenting the PRID regeneration challenge to the client before serving the requested content, as opposed to the "passive mode", in which the PRID regeneration challenge is served with the contents. When it is decided to filter-out clients without browser capabilities from a certain IP or session, or from specific sections of a website, the originating machine first searches any request received from that IP or session for an embedded PRID (for example, within query-string, within any HTTP header value or any other collection of values normally sent as part of a request). In case the request does not have a PRID, the originating machine or web server collects all request information such as, and without wishing to be limited, the requested URL/URI, the HTTP header values, and query-string values, which are required to duplicate the request. The originating machine generates a PRID, and then in response to the request, instead of running the server-side code which resides at the requested URL and releasing the requested content to the client, the originating machine releases a page with client-side code, that is intended, if interpreted and run correctly by a client having browser capabilities, to reproduce the same request sent before with the regenerated PRID embedded to it (either as an additional HTTP header or query string value or with any collection of values typically sent as part of a request). This response serves as a gateway, validating the presence of browser capabilities before rendering and serving the requested contents. Typically, but without wishing to be limited, the gateway response will include the PRID regeneration challenge and a form which includes all the HTTP get/post keys and values from the previous requests, and another field into which the PRID will be inserted. The form will auto submit itself (via client-side script) to the web server, hence the original request is duplicated with a regenerated PRID embedded to it (as a get or post value or as a cookie). The gateway response may include additional functions to check the validity of the request and the client requesting it. For instance, a script which checks if the page is positioned at top of the browsers documents hierarchy, or as a child (such as iFrame) and whether the top documents belongs to the same site domain. The script may be set not to submit the form if some conditions are found dissatisfying, such as if the document is not a top document, or blurred (not focused), and thus block unaware automation, such as Cross Site Request Forgery, and non-human operated browsers and browser objects.

Any request on that specific IP or session, which arrives at the originating machine with a recognized PRID embedded in it, will be responded to with the requested content, while if there is no PRID or unrecognized one, the PRID regeneration challenge will be served instead. "Recognized PRID" means a PRID which was generated by originating machine for a HTTP request received recently from that same IP or session.

In some scenarios a client may enter a request-loop if it does not have full browser and/or session capabilities, since if it generates a wrong PRID, it gets a new gateway with a new PRID and so forth. In order to avoid this situation, optionally, if a request is received with a PRID not recognized as one generated before for that IP or session, the next generated PRID may contain a flag (optionally, an extra character), which signals the originating server not to send another gateway response (regeneration challenge) when another consecutive request with an unrecognized PRID is made from the same client. To such a second response, the web server can optionally reply with a message asking the user to turn sessions/cookies on.

According to some embodiments, a state machine rule engine may score the suspicious internet users and instantly restrict the internet behavior of such users according to the scores. Such state machine can be set to recognize harmless bots and keep their activity uninterrupted, while restricting suspicious users. Such a restriction can be for example and without wishing to be limited by raising a "gateway challenge", a CAPTCHA or even blocking entirely bad IPs and sessions according to the parameters gathered and according to the state machine policy rules. The state machine logic optionally resides separately from the web server, on a controller machine.

According to some embodiments, the present invention provides a controller machine, which, according to state machine rules or any rule-set, can trigger the web-server to apply certain challenges or sanctions against certain sessions or certain IP addresses. If the controller machine concludes that a certain IP or session is suspected, it sends to the web-server, or alternatively to a central storage unit which is accessible to all application web servers (typically: mem-cache), or to a network appliance, an instruction to apply the chosen sanction or challenge on the certain IP or session (such as, but not limited to, regeneration challenge, CAPTCHA, complete block, or Sandbox mode). The web-server, central storage unit or network appliance will store the instructions telling which sanctions or challenges are applied to which IPs and/or sessions. When a new request from a listed IP and/or session will be made to a web server, it will first lookup its instructions collection and if an instruction is applicable, it will respond with the sanction or challenge that is listed for the IP or session.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and/or the ability to execute one or more instructions may be described as a computer, including but not limited to a PC (personal computer), a server, a minicomputer, a cellular telephone, a smart phone, a PDA (personal data assistant), a pager, TV decoder, game console, digital music player, ATM (machine for dispensing cash), POS credit card terminal (point of sale), electronic cash register. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4 is an exemplary structure of a PRID script; and

EMBODIMENTS OF THE INVENTION

The present invention is of a method for detecting bots and in particular for detecting application and protocol based bots and for restricting malicious bots. It does this by identifying whether a web page request comes from a web client with browser capabilities. The invention is also of machines that run the method.

Figure 1A:
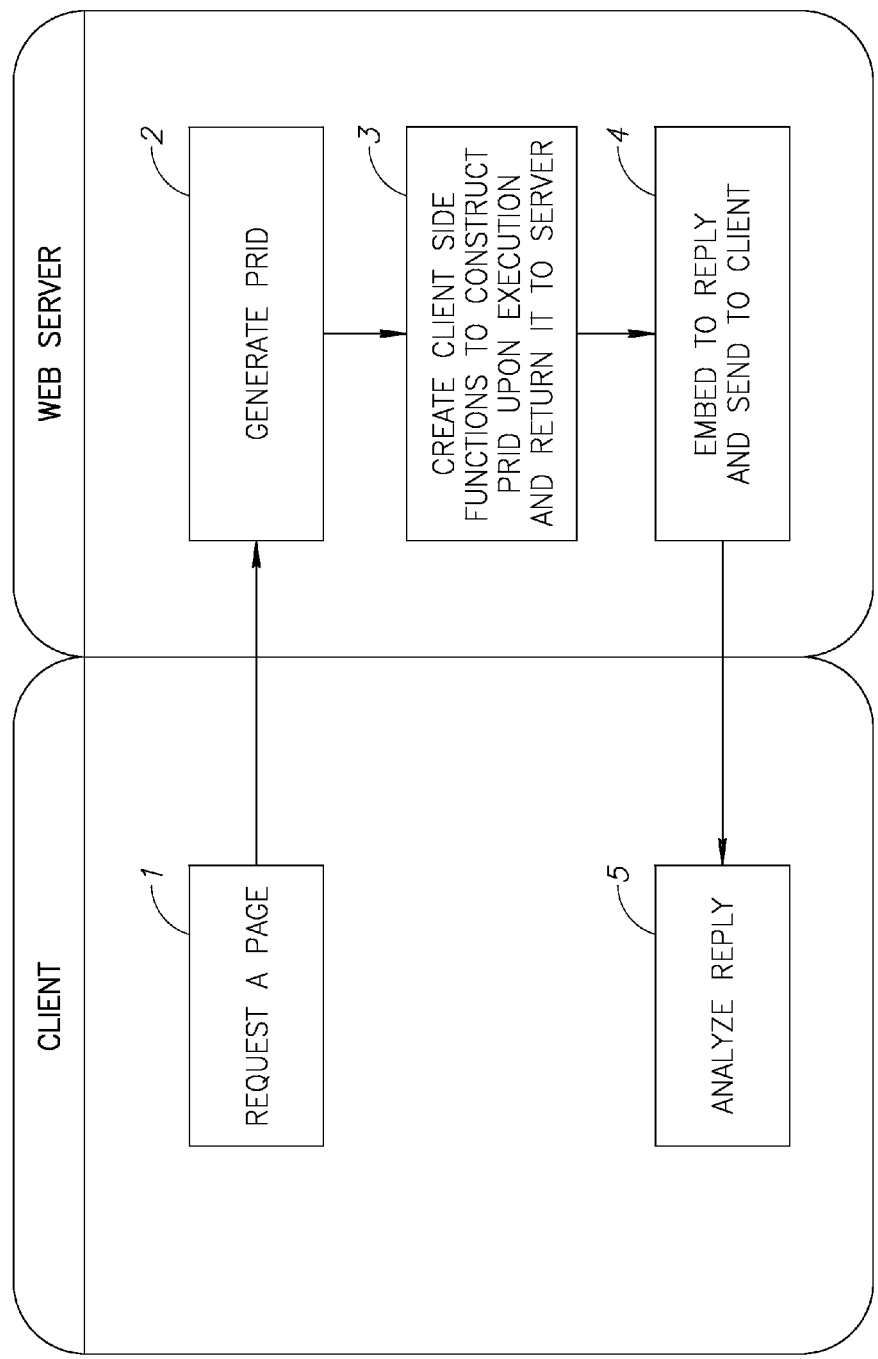
FIGS. 1a-1c are schematic drawing of scenarios illustrating the process of identifying a client.
Figure 1B:
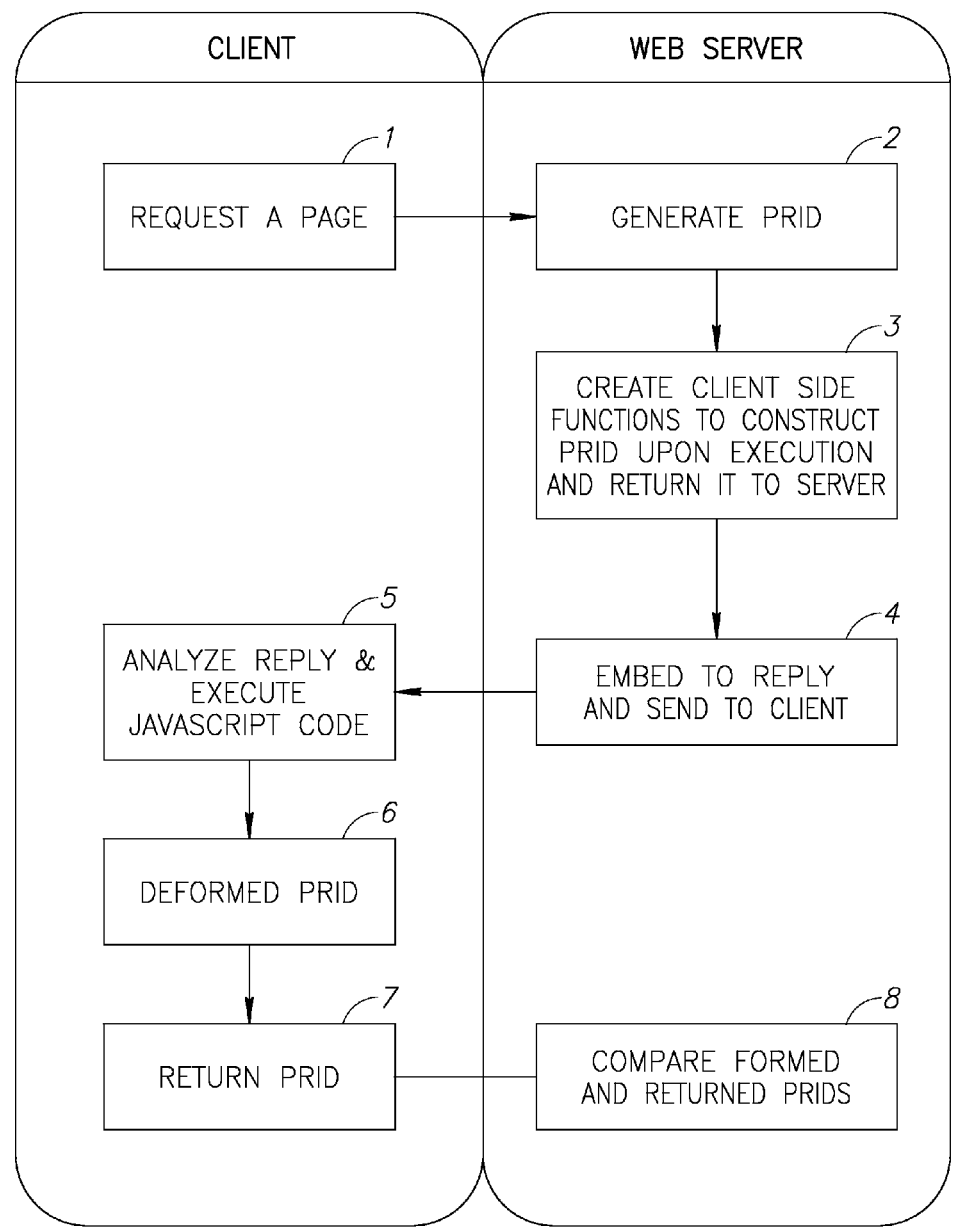
Figure 1C:
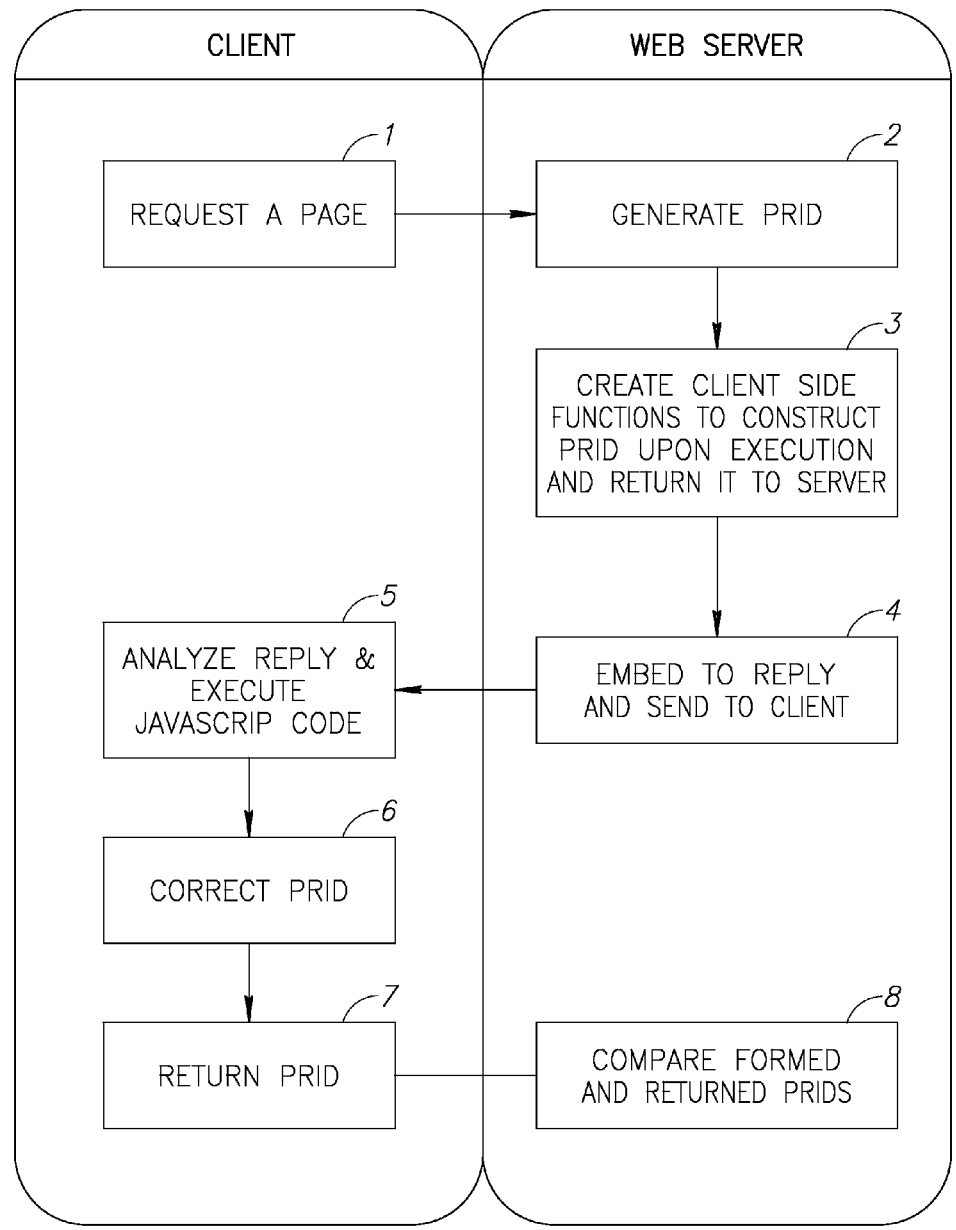

FIGS. 1a-1c are schematic drawings of scenarios illustrating the process of identifying clients. FIG. 1a illustrates a scenario in which the client is a protocol bot. In such a scenario, the client is not capable of generating a PRID at all and thus the system identifies this client as a client not having browser capabilities. In stage 1, the client requests a page. In stage 2 the web server generates a PRID, after receiving the request. In stage 3 the server generates client side functions to construct PRID upon execution. These functions are embedded in the reply and returned to the client in stage 4. In stage 5, the client analyses the reply and, since the client is a protocol bot, the client is not capable of executing the Java script that is embedded in the response, and thus is identified by the server as a client not having browser capabilities.

FIG. 1b illustrates a scenario in which the client is an application bot. In such a scenario, the client is not capable of generating a correct PRID. Though the client is capable of executing the java scripts the client is not able to access the required objects; thus, the system identifies this client as a client not having browser capabilities. In stage 1, the client requests a page. In stage 2 the web servers generates a PRID, after receiving the request. In stage 3 the server generates client side functions to construct PRID upon execution. These functions are embedded in the reply and returned to the client in stage 4. In stage 5, the client analyses the reply and executes Java script, since the client is an application bot, the client is not capable for accessing the required objects and thus generates deformed PRID. In stage 7, the client sends the generated PRID to the server. In stage 8, the server compares the original PRID to the PRID sent by a client. The server does not find a match between the two PRIDs and thus the server identifies the client as a client not having browser capabilities.

FIG. 1c illustrates a scenario in which the client is a browser. In such a scenario, the client is capable of generating a correct PRID. The client is capable of executing the java scripts and to access the required objects; thus, the system identifies the client as a client having browser capabilities. In stage 1, the client requests a page. In stage 2 the web server generates a PRID, after receiving the request. In stage 3 the server generates client side functions to construct PRID upon execution. These functions are embedded in the reply and returned to the client in stage 4. In stage 5, the client analyses the reply and executes Java script. In stage 6 the client generates a correct PRID. In stage 7, the client sends the generated PRID to the server. In stage 8, the server compares the original PRID to the PRID sent by a client. The server finds a match between the two PRIDs and thus identifies the client as a client having browser capabilities.

Figure 2:
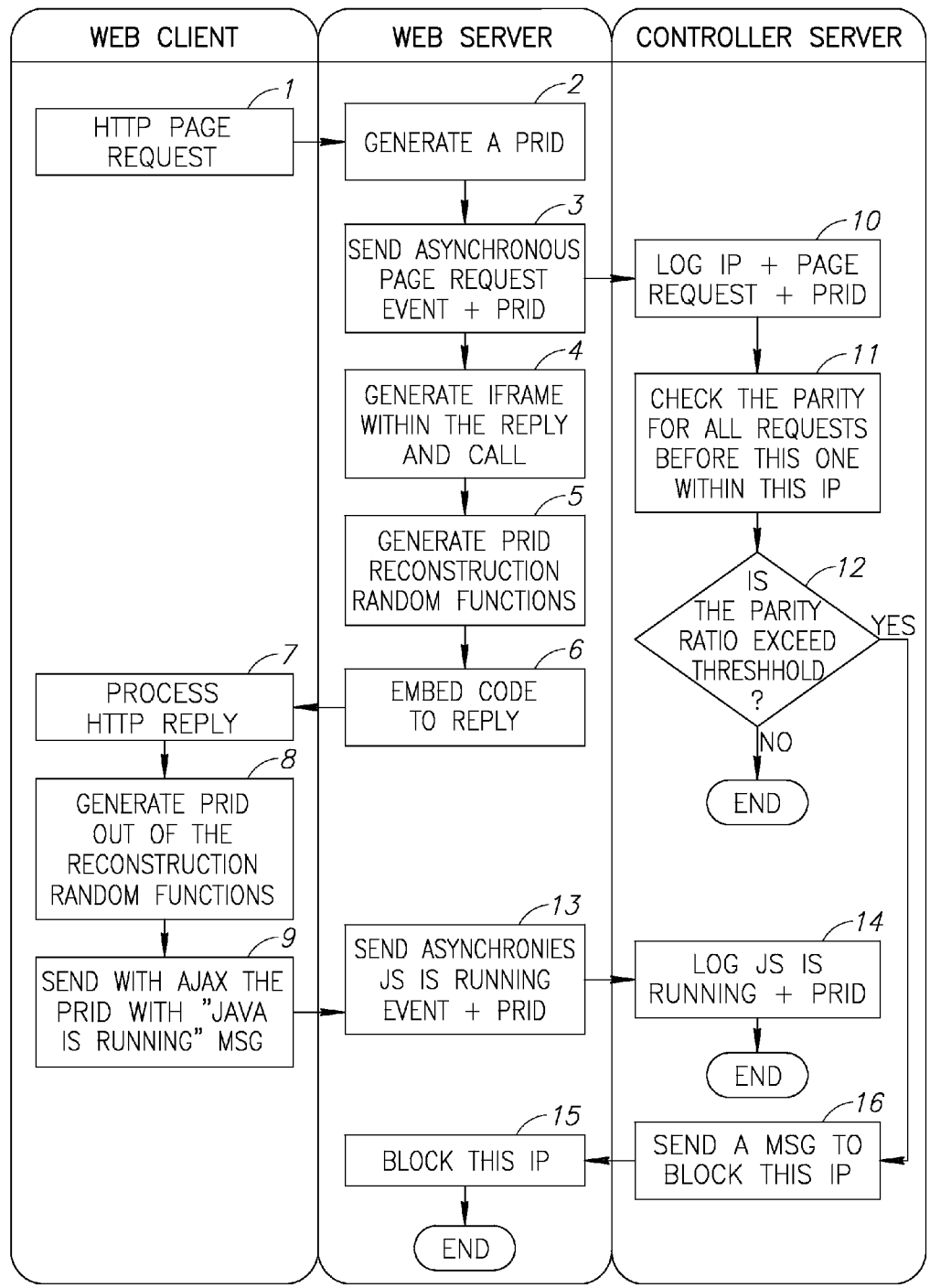
FIG. 2 is an exemplary scenario illustrating the passive mode.

FIG. 2 is a high level flow diagram of the process of identifying HTTP requests from clients not having browser capabilities [passive mode].

According to another embodiment of the present invention, there is provided a mode for monitoring requests while keep serving the requested contents by the web server. This mode is termed herein after as "passive mode". According to this embodiment, the requests are monitored for distinguishing between requests generated by clients having browser capabilities and any other client requests. By monitoring is meant capturing and analyzing traffic in a non intrusive manner. The "passive mode" optionally enables to apply decision making rules before taking any active step. Such decision making rules can be, for example and without wishing to be limited, allowing the handling of specific requests from a client not having browser capabilities which are classified as being legitimate clients. Such legitimate users can be, for example and without wishing to be limited, a search engine indexing spider. Such decision making rules can (optionally and without wishing to be limited) classify the user according to level of suspiciousness for assigning one or more restrictions according to the level of suspiciousness and by the identity of the originator of the requests.

Referring now to the drawing, in stage 1 a web client issues a request for a page from a browser. In stage 2, the module in the web server which is responsible for detecting suspicious bots generates a page request id, which is a unique identification of the request. In stage 3, the page request id along with the requested content is sent from the web server to the controller machine as a page request event. In stage 4[optional], an Iframe is generated and calls additional client-side files from the controller machine, which are being embedded in the returned page. In this controller client-side script file, dynamic data gathering functions can be embedded to collect data that will be sent further on the process at stage 9. In stage 5, page request id reconstruction functions are generated. Page request id reconstruction functions are functions which, when invoked, generate the page request id. In stage 6, the code is embedded in the reply and is sent to the web client. In stage 7, which is performed after receiving a reply from the web server, the reply is processed. In stage 8, which is performed only if the client has browser capabilities the page request id is generated out of the PRID regeneration functions. In stage 9, the page request id is sent back to the web server with an additional request for example and without wishing to limit to, Ajax, HTTP get or HTTP post. Alternatively, the PRID can be sent directly to the controller machine and not to the originating machine. In stage 13, which is performed when the message sent in stage 9 arrives in the web server, an asynchronous message is sent to the controller machine, with the regenerated PRID, to report that PRID was regenerated and returned. In stage 14, which is performed when the controller machine receives the message sent in stage 13, the regenerated PRID is stored on the controller machine. If the regenerated PRID matches the originally generated PRID, a pair of same PRIDs are received and stored on the controller machine. In stage 10, which is performed by the controller machine after receiving the first event with the page request id, the event is logged for performing a parity check process. The parity check is performed for all the requests comprising the same IP address as the current request. Such a parity check does not comprise the current request but only the requests prior to this request. In stage 12, the number of page request events that are not paired with a corresponding page request event for the same IP and thus indicate a request from a client not having browser capabilities are compared to a predefined threshold. In stage 16, which is performed when the disparity value exceeds the predefined threshold, a message for restricting the IP is sent to the web server. According to one embodiment the message can be for blocking the IP. According to another embodiment, the message can be for restricting the IP according to predefined rules. In such a case the message can optionally be sent to another server which can optionally apply the rules and sent the restriction command to the web server. In stage 15, the IP is blocked, if required.

Figure 3:
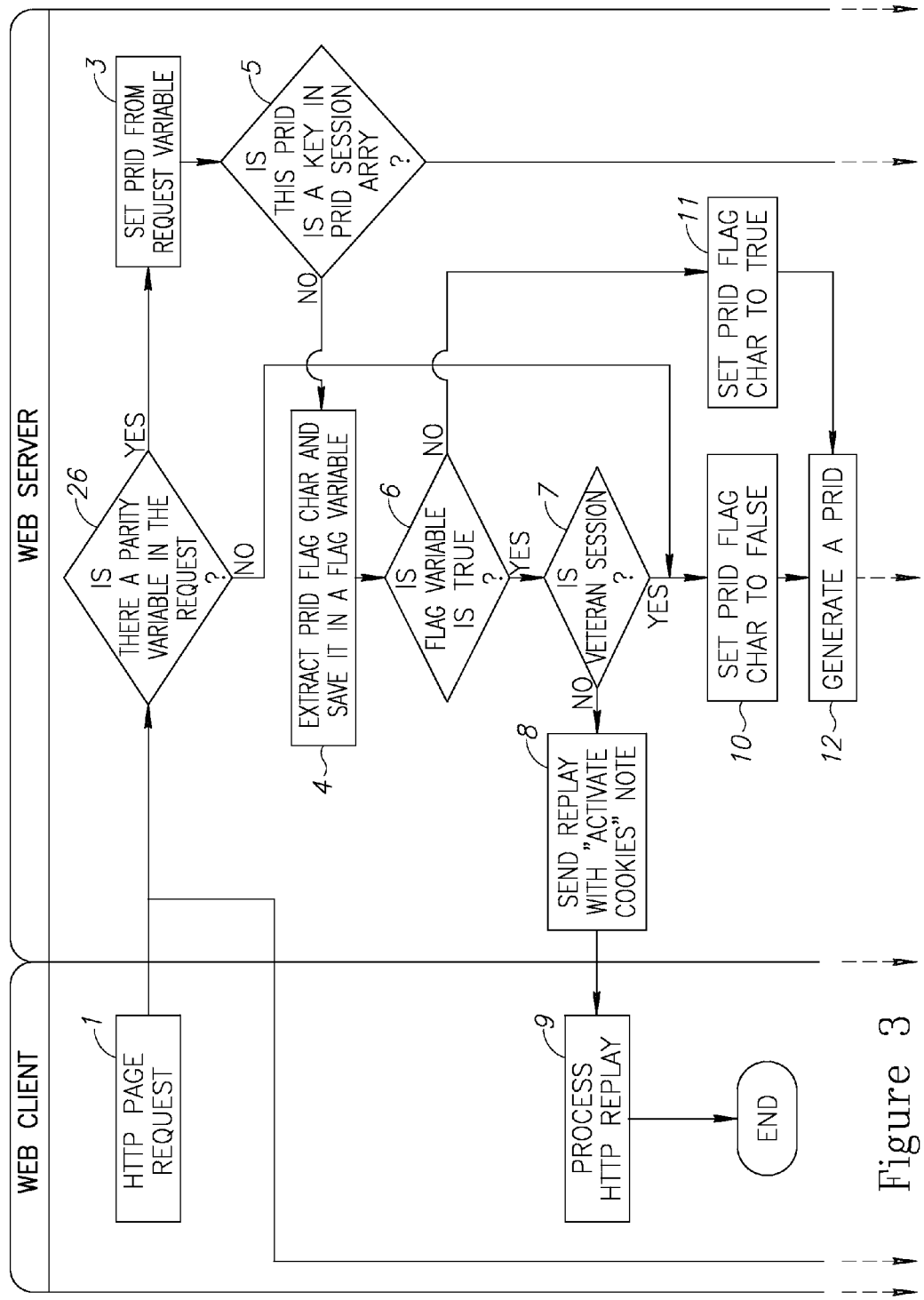
FIG. 3. is an exemplary scenario illustrating the active mode.
Figure 3:
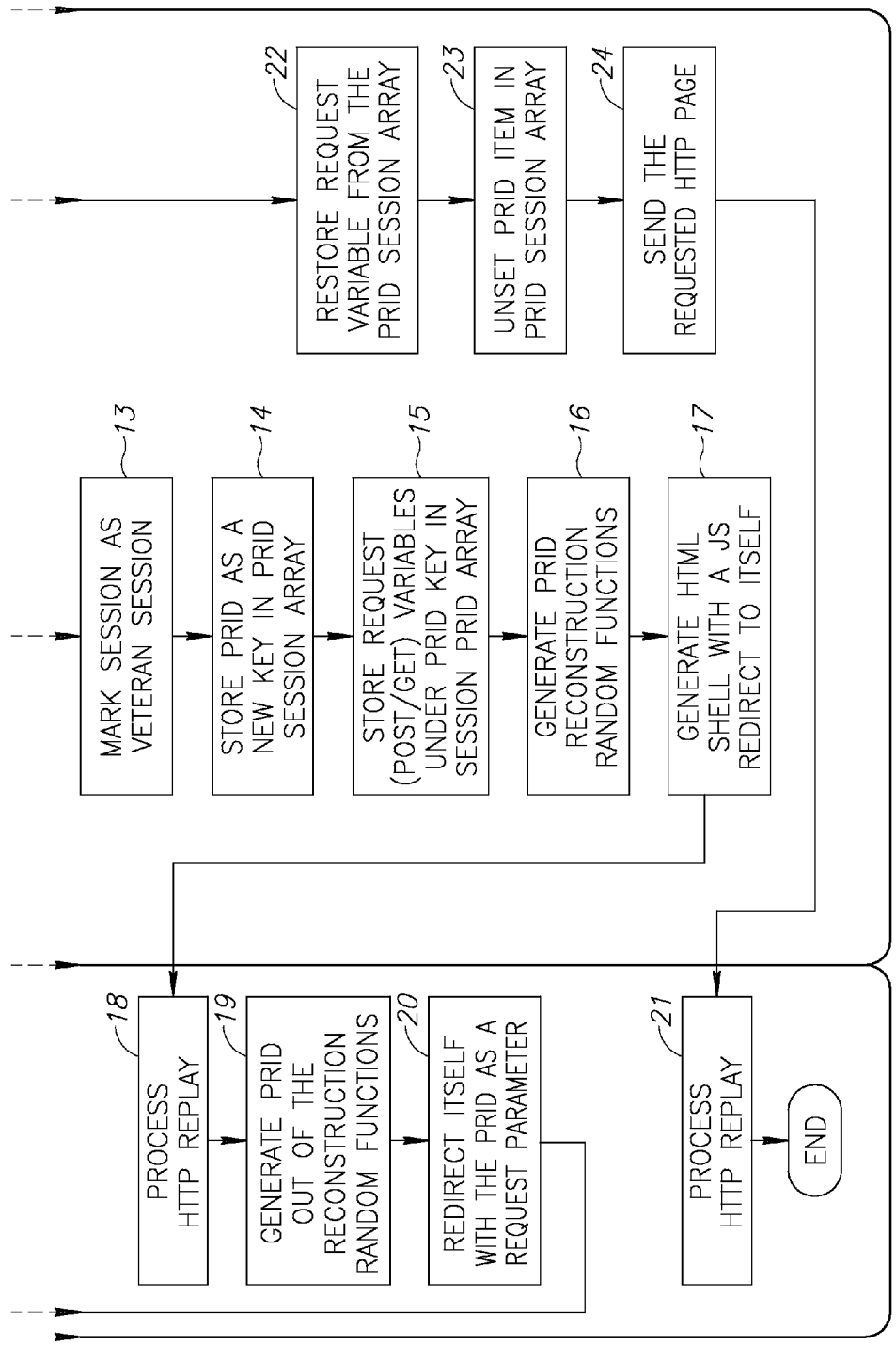

FIG. 3 is an exemplary scenario describing the active mode. In stage 1, a page request is sent from a WEB client to a Web server. In stage 2, the web browser checks if there is a PRID variable in the request. If there is not, this is assumed to be a first request to the URL/URI. A PRID flag which can be, but is not limited to, a character within the PRID generated string, is set to false in stage 10. The flag is used for preventing endless looping which can occur if the browser is set to work in a mode in which cookies are disabled. In stage 12, a PRID is generated and the session is marked as a veteran session in stage 13, indicating that this session is not newly generated when a next request from the same client arrives. In stage 14, the PRID is saved as a key in a PRID session array. This array is used for storing request related information to be used when a response is performed. Such information can be, for example and without wishing to be limited, the POST or GET method variables that are sent by the request. In stage 15, request variables are stored in the key session array. In stage 16, PRID reconstruction random functions are generated. Such functions, when activated, generate the PRID. In stage 17, an HTML shell with the PRID reconstruction random functions and a JS redirect to itself is generated and a response is returned to the web client. Stages 18-21 are performed by the web client when the first response comprising functions for generating PRID is received by web client. In stage 18, HTTP reply is processed. In stage 19, PRID is generated out of the reconstruction random functions. In stage 20, page redirect itself with a PRID as a request parameter.

If the answer to the question "is there a PRID variable in the request?" is "yes", the system assumes that this is a second request and the PRID is extracted from the request and saved in stage 3. In stage 5, the system checks whether that PRID is a key in the PRID session array. If so, then the request variables are restored from the PRID session array in stage 22. The PRID key in the PRID session array is cleared in stage 23 and in stage 24 the requested HTTP page is sent to the client and is processed by the client in stage 21. If the answer to the question posted in stage 5 is "no" (PRID is not a key in session array) then this is a specific case in which the PRID is a leftover from a previous request. In this case the system extracts the PRID flag in stage 4. In stage 6, the system checks if the flag variable is true. If it is not true, it sets it to true in stage 25 in order to mark the situation in which there was a PRID request variable but it was not found in the session array. Then in stages 10-17 it resends the HTTP page shell again to generate a response comprising PRID reconstruction random functions. If it comes back again with the PRID flag as true, then the system checks in stage 7 if this is a veteran session. If so, then stages 10-17 are performed to generate a response comprising PRID reconstruction random functions. If the session is not marked as veteran in stage 7, it means that something is wrong as this request has been processed but there was no trace for it in the session. This situation can happen if the request was processed by a browser that has its cookies mode turned off. In this case, a proper message is sent to the client. This flag is used for preventing infinite loops in the case that there are no cookies in the browser. 5

FIG. 4 is an exemplary structure of a PRID script. According to one embodiment, the script requires an interpreter in order to run and never has the PRID explicitly embedded in its code, hence "scraping" of the PRID is not possible. Such attributes ensures that a correct PRID is only generated on clients having the script interpreter or runtime environment. The scripts additionally and optionally use page and browser objects in the code that generates the PRID. The requirement for using the objects ensures that only browsers which render the page and hold object references (typically DOM—Document Object Model and browser objects like navigator, window, location and the like) are able to regenerate the correct PRID. In the exemplary script the PRID that is generated is KXqe.

Figure 5:
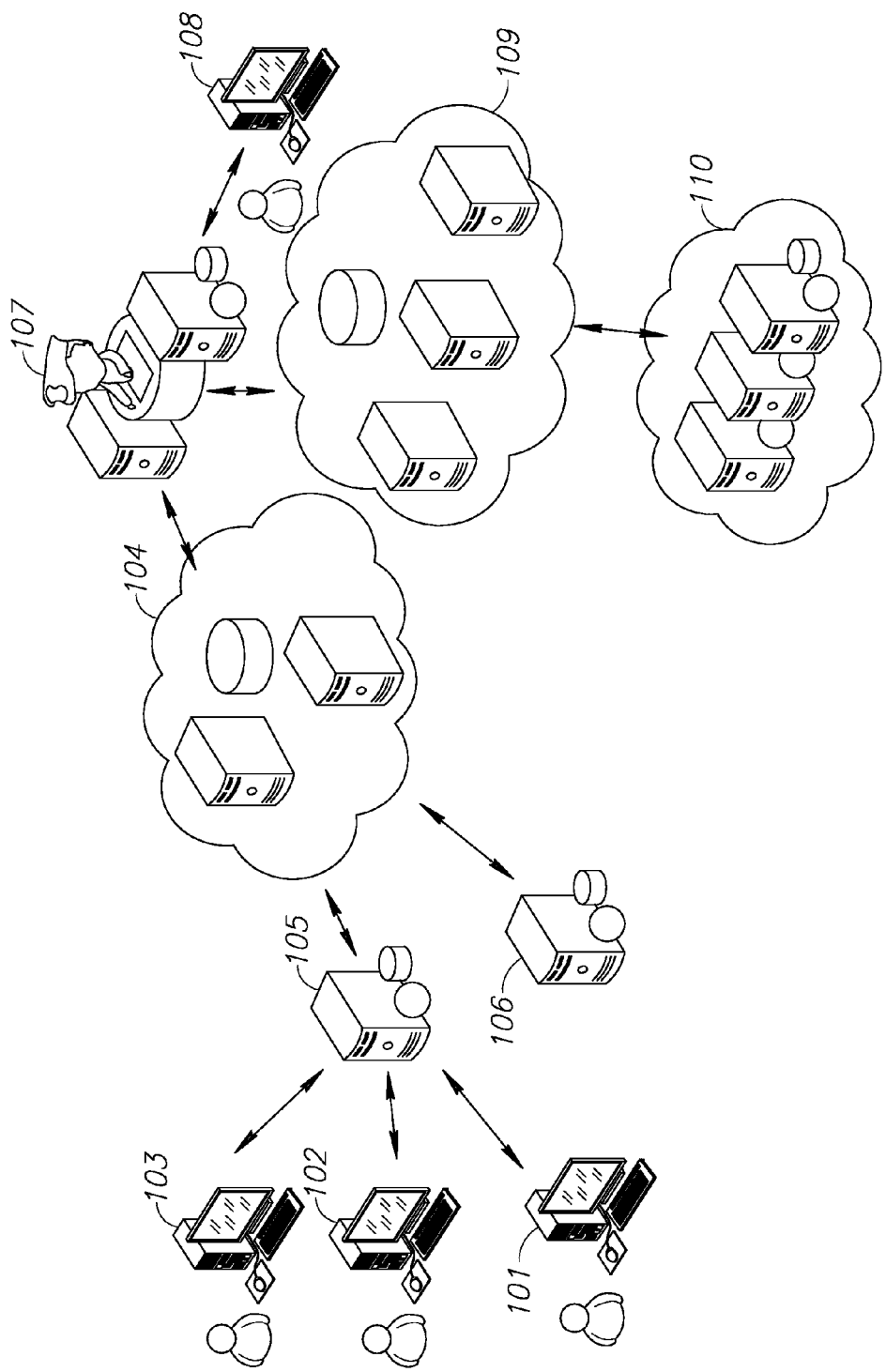
FIG. 5 is an exemplary description of the system according to one embodiment of the present invention.

FIG. 5 is a schematic drawing of the system. As shown, a system 100 features, a plurality of user computers shown as user computer A 101, B 102 and C 103, which may optionally be of any suitable number but of which only three are shown for the purpose of illustration only and without any intention of being limiting in any way; a plurality web servers shown as web server A 105 and web server B 106 which may optionally be of any suitable number but of which only two are shown for the sake of illustration only and without any intention of being limiting in any way; cluster dedicated servers 109, corporate servers 110, cluster server tier 1 104, tier 2 central DB 107 and a user computer 109. User computers A 101, B 102 and C 103 are connected to web server A 105 and web server B 106, preferably via the internet for retrieving information from the web server. It should be noted that more than one cluster servers can be operated and only one is shown for the purpose of illustration only. User computers A 101, B 102 and C 103 usually operate legitimate queries to servers A 105 and web server B 106; such queries can be, for example queries initiated by a legitimate browser, and the like. However, user computers A 101, B 102 and C 103 might operate illegal queries that are initiated by malicious Bots. Corporate servers 110 are also connected to the internet, usually via a singular IP address and operate queries from a plurality of users using the singular IP address. In the exemplary diagram corporate servers are connected to cluster dedicated tier 1 servers 109 for serving the corporate servers 110 only. System 100 secures the web servers from malicious bots by using a dedicated software module which is installed on each web servers and by using tier 1 servers shown as 104 and 109 and tier 2 servers shown as 107. Cluster servers Tier 1 104 and cluster dedicated servers 109 communicate with the web servers in order to identify malicious bots. The communication is preferably done via the internet. The method for suspecting malicious bots is explained in great details in FIG. 2A and FIG. 2B. When a suspected bot is found, a message is sent to the Tier 2 servers 107. Tier 2 servers 107 perform further operations for classifying the bot and for assigning restrictions, if required. The information regarding suspicious bots is preferably kept in the database of the tier 2 server 107 for the future assessment of severity level. The process of classifying the suspiciousness and assigning restrictions is based on parameters which are configurable by an operator via a user computer shown as user computer A 109. Configuration is preferably done via dashboard web interface 108. Tier 2 server 107 preferably communicates with the relevant web servers for updating the web servers regarding the suspicious bot and the assigned restrictions. Web servers shown as web server A 105 and web server B 106 perform retractions on queries from the suspicious bots as required by tier 2 server 107. Tier 2 server 107 and web servers preferably communicate via the internet. It should be noted that Tier 1 servers and Tier 2 servers are optional and the functionally detection of malicious bots can be embedded in the web servers shown as web server A 105 and web server B 106. It should also be noted that the classification of the suspicious bots is optional and the system can operate without such classification. The classification, if used can be embedded in any server such as tier 1 server, web server and the like.

While the invention has been described with respect to a limited number of embodiments, it will be appreciated that many variations, modifications and other applications of the invention may be made.

The invention claimed is:

1. A method of determining browser capabilities of a web client, comprising:
receiving, by an originating machine, a request for a web page from the web client;
generating, by the originating machine, responsive to receipt of the request:
a page request identification (PRID),
a response to the received request for a web page, said response including instructions that, when interpreted by a browser, cause the browser to generate at least one of a page object or a browser object, and
a script which, when executed by the browser, causes the browser to regenerate the PRID based on the at least one page object or browser object, and
embedding, by the originating machine, the generated script in the generated response;
sending, by the originating machine, the response, including the embedded script, to the web client for the web client to process by utilizing the browser;
automatically and independently executing, by the web client, the embedded script to regenerate the PRID based on the web client having browser capabilities, and returning the regenerated PRID to the originating machine;
comparing, by the originating machine, the returned regenerated PRID with the generated PRID to determine whether a match exists, the match indicating that the web client has the browser capabilities,
wherein the embedded script comprises a portion of a document which can be interpreted by the browser and rendered into a document object model, and client side script which is used to query the document and the document object model and yield known characters or strings in return, and
wherein the embedded script yields different PRIDs on different browsers, depending on the way the different browsers run scripts and render documents into the document object model.

2. The method according to claim 1 wherein the PRID comprises a combination of numbers and/or characters.

3. The method according to claim 1 wherein the PRID is generated using a server-side code.

4. The method according to claim 1 wherein the PRID is generated using a web-server filter or a network appliance.

5. The method according to claim 1 where the embedded script comprises a sequence of functions or sub-scripts.

6. The method according to claim 5 wherein a controller machine produces banks of functions or sub-scripts for the originating machine, and the controller machine updates the banks on the originating machine from time-to-time.

7. The method according to claim 1 wherein the different PRIDs serve to further identify a browser type and version and validate the browser type and version against the HTTP headers, including User-Agent.

8. The method according to claim 1, wherein the regenerated PRID is returned with the next page request or in a separate request designated for the purpose.

9. The method according to claim 1 wherein the originating machine further comprises storage means for storing the generated PRIDs and an indication of the returned regenerated PRIDs.

10. The method according to claim 1 wherein the originating machine further sends the generated PRIDs and the returned regenerated PRIDs to a controller machine which comprises storage means for storing the generated PRIDs and the returned regenerated PRIDs and computes matches and match ratios per corresponding IP address and session.

11. The method according to claim 1 further comprising: determining that the web client is a suspected bot based on detecting at least one of a predetermined number and a predetermined ratio of PRIDs generated in response to page requests from the same IP address without the web client returning the regenerated PRIDs or with the web client returning only deformed PRIDs.

12. The method according to claim 11 wherein the suspected bot or a chosen IP or session is set a challenge that it must satisfy before a requested web page is delivered.

13. The method according to claim 12 wherein the challenge comprises:
generating, by the originating machine, a second PRID and a second script which, when executed by the web client with said browser, regenerates the second PRID and reproduces the previous page request;
embedding, by the originating machine, the second script in a second response;
sending, by the originating machine, the second response to the web client for the web client to process, utilizing the browser, and, based on determining that the web client has the browser capabilities, automatically executing the embedded second script, thereby to regenerate the second PRID and the previous page request, and to return the regenerated second PRID and the previous page request to the originating machine; and
comparing, by the originating machine, the returned regenerated second PRID with the generated second PRID and, in response to a match, sending the previously requested page.

14. The method according to claim 12 wherein the challenge comprises additional functions to condition re-submission of the page request with the embedded PRID on further tests that ensure that the page is being viewed and displayed on a web browser and is not run in the background on an iFrame, a child window or a browser running as a background service.

15. The method according to claim 11, wherein the page requests from the suspected bot are either blocked or restricted according to rules, optionally held on a rule engine.

16. The method according to claim 1, wherein the originating machine comprises a web server or an intermediate entity in front to the web client side of the web server.

17. The method according to claim 1, wherein a controller machine performs one or more at least a portion of the method.

18. The method according to claim 1, wherein said portion of the document includes HTML tags.

19. A system for determining browser capabilities of a web client, the system comprising an originating machine having a processor configured to perform instructions stored on a non-transitory computer readable medium, to implement at least the following tasks:
  receive a request for a web page from the web client;
  generate:
    a page request identification (PRID),
    a response to the request for a web page, said response including instructions that, when interpreted by a browser, cause the browser to generate at least one of a page object or a browser object, and
    a script which, when executed by the browser, causes the browser to regenerate the PRID based on the at least one page object or browser object;
  embed the generated script in the response;
  send the response, including the embedded script, to the web client for the web client to process, utilizing the browser, and, based on the web client having the browser capabilities, to automatically and independently execute the embedded script, thereby to regenerate the PRID, and to return the regenerated PRID to the originating machine; and
  compare the returned regenerated PRID with the generated PRID, to determine whether a match exists, the match indicating that the web client has the browser capabilities,
  wherein the embedded script comprises a portion of a document which can be interpreted by the browser and rendered into a document object model, and client side script which is used to query the document and the document object model and yield known characters or strings in return, and
  wherein the embedded script yields different PRIDs on different browsers, depending on the way the different browsers run scripts and render documents into the document object model.

20. The system according to claim 19 wherein the PRID comprises a combination of numbers and/or characters.

21. The system according to claim 19 wherein the PRID is generated using a server-side code.

22. The system according to claim 19 wherein the PRID is generated using a web-server filter or a network appliance.

23. The system according to claim 19 where the embedded script comprises a sequence of functions or sub-scripts.

24. The system according to claim 23 wherein a controller machine produces banks of functions or sub-scripts for the originating machine, and the controller machine updates the banks on the originating machine from time-to-time.

25. The system according to claim 19 wherein the different PRIDs serve to further identify a browser type and version and validate the browser type and version against the HTTP headers, including User-Agent.

26. The system according to claim 19, wherein the regenerated PRID is returned with the next page request or in a separate request designated for the purpose.

27. The system according to claim 19 wherein the originating machine further comprises storage means for storing the generated PRIDs and an indication of the returned regenerated PRIDs.

28. The system according to claim 19 wherein the processor is further configured to send the generated PRIDs and the returned regenerated PRIDs to a controller machine which comprises storage means for storing the generated PRIDs and the returned regenerated PRIDs and computes matches and match ratios per corresponding IP address and session.

29. The system according to claim 19 wherein the processor is configured to determine that the web client is a suspected bot based on detecting at least one of a predetermined number and a predetermined ration of PRIDs generated in response to page requests from the same IP address without the web client returning the regenerated PRIDs or with the web client returning only deformed PRIDs.

30. The system according to claim 29 wherein the suspected bot or a chosen IP or session is set a challenge that it must satisfy before a requested web page is delivered.

31. The system according to claim 30 wherein the processor is further configured to perform the challenge, including:
  generate a second PRID and a second script which, when executed by the web client with said browser, regenerates the second PRID and reproduces the previous page request, and
  embedding the second script in a second response;
  send the second response to the web client for the web client to process, utilizing the browser, and, based on the web client having the browser capability, to automatically execute the embedded second script, thereby to regenerate the second PRID and the previous page request, and to return the regenerated second PRID and the previous page request to the originating machine; and
  compare the returned regenerated second PRID with the generated second PRID and, in response to a match, sending the previously requested page.

32. The system according to claim 30 wherein the challenge comprises additional functions to condition re-submission of the page request with the embedded PRID on further tests that ensure that the page is being viewed and displayed on a web browser and is not run in the background on an iFrame, a child window or a browser running as a background service.

33. The system according to claim 29, wherein page requests from the suspected bot are either blocked or restricted according to rules, optionally held on a rule engine.

34. The system according to claim 19, wherein the originating machine comprises a web server or an intermediate entity in front to the web client side of the web server.

35. The system according to claim 19, further comprising a controller machine having a second processor configured to perform at least one of the receiving task; the generating task; the embedding task; and the sending task.

36. The system according to claim 19, wherein said portion of a document includes HTML tags.

37. A non-transitory program storage device readable by a machine, tangibly embodying a program of instructions executable by the machine to perform a method for determining browser capabilities of a web client, comprising:
  receiving, by an originating machine, a request for a web page from the web client;
  generating, by the originating machine, responsive to receipt of the request:
    a page request identification (PRID),
    a response to the received request for a web page, said response including instructions that, when interpreted by a browser, cause the browser to generate at least one of a page object or a browser object, and
    a script which, when executed by the browser, causes the browser to regenerate the PRID based on the at least one page object or browser object;

embedding, by the originating machine, the generated script in the generated response;

sending, by the originating machine, the response, including the embedded script, to the web client for the web client to process, utilizing the browser, and, based on the web client having the browser capabilities, automatically and independently executing, by the web-client, the embedded script, thereby to regenerate the PRID, and to return the regenerated PRID to the originating machine; and comparing, by the originating machine, the returned regenerated PRID with the generated PRID, to determine if a match exists, the match indicating that the web client has browser capabilities, wherein the embedded script comprises a portion of a document which can be interpreted by the browser and rendered into a document object model, and client side script which is used to query the document and the document object model and yield known characters or strings in return, and wherein the embedded script yields different PRIDs on different browsers, depending on the way the different browsers run scripts and render documents into the document object model.

38. The method according to claim 3 wherein the server-side code is a combination of one or more of: PHP, .Net framework or Python.

39. The method according to claim 4 wherein the web-server filter is Internet Server Application Programming Interface (ISAPI).

40. The method according to claim 16 wherein said intermediate entity is a logical or physical third party server or any logical or physical network machine.

41. The system according to claim 21 wherein the server-side code is a combination of one or more of: PHP, .Net framework or Python.

42. The system according to claim 22 wherein the web-server filter is Internet Server Application Programming Interface (ISAPI).

43. The system according to claim 34 wherein said intermediate entity is a logical or physical third party server or any logical or physical network machine.

* * * * *